(12) United States Patent
Campbell et al.

(10) Patent No.: US 7,851,008 B2
(45) Date of Patent: Dec. 14, 2010

(54) HIGH FAT TO PROTEIN RATIO EGG YOLK PRODUCT AND METHODS FOR MAKING AND UTILIZING SAME

(76) Inventors: James Stewart Campbell, 29834 Burgress Avenue, Abbotsford (CA) V4X 2G6; Ian Gordon Cooke, 4376 Keith Wilson Road, Chilliwack (CA) V2R 4B4

( * ) Notice: Subject to any disclaimer, the term of this patent is extended or adjusted under 35 U.S.C. 154(b) by 383 days.

(21) Appl. No.: 11/742,392

(22) Filed: Apr. 30, 2007

(65) Prior Publication Data

US 2008/0268124 A1 Oct. 30, 2008

(51) Int. Cl.
*A23L 1/32* (2006.01)
(52) U.S. Cl. ............... 426/614; 426/299; 426/298; 426/431; 426/425; 426/429; 426/417; 426/490
(58) Field of Classification Search .............. None
See application file for complete search history.

(56) References Cited

U.S. PATENT DOCUMENTS

| | | | | |
|---|---|---|---|---|
| 3,958,034 A | * | 5/1976 | Nath et al. | 426/614 |
| 4,157,404 A | * | 6/1979 | Yano et al. | 426/429 |
| 5,082,674 A | | 1/1992 | Carrell et al. | |
| 5,409,720 A | | 4/1995 | Kent et al. | |
| 5,834,050 A | * | 11/1998 | Chung | 426/555 |
| 6,217,926 B1 | | 4/2001 | Merkle | |
| 6,824,800 B1 | * | 11/2004 | Mitsuya et al. | 426/302 |

FOREIGN PATENT DOCUMENTS

| | | |
|---|---|---|
| CA | 2171317 | 3/1995 |
| SU | 1722395 A1 * | 3/1992 |

OTHER PUBLICATIONS

E.M. Akita, S. Nakai (1992), "Immunoglobulins from Egg Yolk: Isolation and Purification", Journal of Food Science 57 (3), 629-634, May 1992.
W.S. Mueller, F.C. Burrow, "The Use of Dehydrated Egg Products in the Manufacture of Ice Cream", Journal of Dairy Science, vol. XII, No. 4, 1929.

* cited by examiner

*Primary Examiner*—Jennifer C McNeil
*Assistant Examiner*—Hong Mehta
(74) *Attorney, Agent, or Firm*—Oyen Wiggs Green & Mutala LLP

(57) ABSTRACT

The present invention relates to a high fat to protein ratio egg yolk product and a method of preparing same. More particularly, the invention pertains to a dried high fat to protein ratio egg yolk product which substantially maintains the functional characteristics of whole egg yolk, is convenient to use, and has a long shelf life. The present invention also relates to a method of utilizing such a high fat to protein ratio product in making egg containing bakery products, mayonnaise and other food products. A process for preparing a dried high fat to protein ratio egg yolk which comprises: (a) separating an egg yolk from a whole egg; (b) concentrating the fat to protein ratio of the egg yolk so that the ratio is greater than 2.0:1, and (c) drying the concentrated egg yolk.

19 Claims, No Drawings

HIGH FAT TO PROTEIN RATIO EGG YOLK PRODUCT AND METHODS FOR MAKING AND UTILIZING SAME

FIELD OF THE INVENTION

The present invention relates to a high fat to protein ratio egg yolk product and a method of preparing same. More particularly, the invention pertains to a dried high fat to protein ratio egg yolk product which substantially maintains the functional characteristics of whole egg yolk, is convenient to use, and has a long shelf life. The present invention also relates to a method of utilizing such a high fat to protein ratio product in making egg containing bakery products, mayonnaise and other food products.

BACKGROUND OF THE INVENTION

Fresh eggs from shells are commonly prepared for consumption as food without being combined with any other food product. Examples are fried eggs, scrambled eggs, omelettes and the like. Eggs are also commonly used in combination with other food ingredients to make various food products such as cakes, bread, muffins and pancakes, Eggs are also used in making mayonnaise and other egg containing food products, such as custards, sauces and the like.

In general, fresh eggs from shells are considered to have desirable characteristics which contribute substantially to the quality of the products in which they are used, such as cakes, mayonnaise, and the like. Thus, cakes which are made "from scratch" are generally considered to be superior in taste and appearance compared to cakes which are made from dried whole egg powder, or dried egg yolk powder. Thus, when dried whole egg powder, or dried egg yolk powder, is used in making a cake it may be desirable (or as a practical matter necessary) to add a certain amount of other functional ingredients to make an attractive end product.

In addition to the inherent taste and nutritional value provided by egg yolk or egg yolk products in baking and other food products, the properties of the egg yolk can also contribute as a foaming agent, an emulsifier, and a bonding agent to the product, thereby adding lightness and cohesiveness to the overall food product structure. In acting as a foaming agent, the egg yolk or egg yolk product "bubbles" when the cake batter is subjected to shear by mixing. Further, as the mixing continues, larger bubbles are broken up into smaller bubbles. This increases the volume of the product, often to several times the original volume of the cake batter.

As an emulsifier, egg yolks facilitate mixing and dispersion of the food product ingredients. The cohesiveness which the egg yolk product contributes to the food product comes from its ability to act as a "glue" or bonding agent, thereby enabling the food product to maintain a foam structure. Thus, one of the desirable qualities in many types of cakes is for the cake structure to occupy a greater volume relative to its total weight, a characteristic which is often referred to as the "lightness" of the cake.

It is not always possible or practical to use fresh eggs in making cakes and the like. In some respects, the use of fresh eggs is inconvenient and/or time consuming. This is particularly true in a high volume commercial operation where a large quantity of eggs must be used for the large batches of food product that are being produced. Accordingly, there have been many attempts over the last several decades to find ways to make the use of eggs or egg products more cost effective in a commercial operation.

Commonly, in shipping eggs to a commercial operation, the whole egg is first removed from the shell at the egg processing location and the shell-less egg is shipped to the user in refrigerated containers. Alternatively, the whole egg can be frozen and shipped to the end user. Thus, there are significant costs not only in the transportation of the egg product, but also the expense of maintaining refrigerating or freezing equipment at the point of use.

An alternative to refrigerating or freezing the eggs or egg product is to dehydrate the eggs or egg product to a powdered form. The powdered egg or egg product has a longer shelf life. Also, removal of the water (which reduces the weight of the egg) lowers shipping costs. However, drying of fresh eggs results in a certain loss of function in the properties of the eggs. The protein in albumen (egg white) is a very complex organic material and, in drying it, the chemical and physical structure becomes reconfigured. The same is true of egg yolk. Also, if the albumen and the yolk are dehydrated together, the two components normally tend to combine with one another in a manner which results in a substantial loss of functional properties.

For some commercial applications, fresh whole eggs are processed to separate the yolk from the albumen. In a typical fresh egg, the composition is approximately 32% "pure" liquid yolk and 68% "pure" liquid albumen. The liquid albumen comprises about 11.9% dry solids and about 88% water. The yoke comprises about 43.5% dry solids and about 56.5% water.

This loss of functional properties caused by drying egg yolk can be reduced somewhat by using certain improved techniques in the process. But as a practical matter in a commercial environment, the dried egg yolk does not perform as well as fresh liquid egg yolk.

When the egg is in the shell (i.e. a shell egg) and delivered to a consumer, the egg is usually not pasteurized. However, when the egg is removed from the shell, governmental health regulations require pasteurization. The pasteurization process normally exterminates, or at least deactivates, pathogenic micro-organisms, and particularly *Salmonella*, that are present in the egg. However, notwithstanding pasteurization, there may still be present in the egg a certain amount of micro-organisms which, though not pathogenic, have the capability of causing spoilage. Further, even though the whole egg or the yolk and/or albumen are pasteurized, in subsequent handling, such as mixing and/or further processing in a commercial operation, it is often difficult to maintain proper isolation of the product from micro-organisms that subsequently contaminate the final egg product.

SUMMARY OF THE INVENTION

The invention is directed to a process for preparing a dried high egg yolk fat to protein ratio egg yolk which comprises: (a) separating an egg yolk from a whole egg; (b) concentrating the fat to protein ratio of the egg yolk so that the ratio is greater than 2.0:1, and (c) drying the concentrated egg yolk.

The invention is also directed to a process for preparing a high fat to protein ratio egg yolk which comprises: (a) recovering an egg yolk from a whole egg; (b) immersing the egg yolk in a solvent; (c) permitting the egg yolk and the solvent to rest for sufficient time that the egg yolk and solvent separate into an upper hydrophilic fraction and a lower lipophilic fraction; (d) removing the upper fraction from the lower fraction; and (e) drying the lower fraction.

The ratio of egg yolk fat to egg yolk protein in the dried lower fraction can be greater than 2.0:1. The lower fraction can be spray dried in a spray dryer having an air inlet temperature of from about 150° C. to 300° C. and an air outlet temperature of from about 75° C. to 175° C. so that the final moisture content of the dried lower fraction is less than about 10% by weight.

The solvent can be water or alcohol or another acceptable food grade solvent. The lower fraction can be dried by freeze drying or by using a belt or a drum dryer.

The invention is also directed to a process for preparing a high fat to protein ratio egg yolk which comprises: (a) producing a high fat to protein ratio egg yolk product from egg yolk by following the method of the invention and using a combining agent in addition to the solvent so that the measured ratio of yolk fat to yolk protein in the recovered egg yolk is greater than 2.0:1, and; (b) drying the recovered egg yolk. The combining agent can be ammonium sulphate, copper sulphate, dextrin or other suitable salt.

The invention is also directed to a process for preparing a high fat to protein ratio egg yolk according to the invention which comprises accelerating separation by using centrifugation to separate the hydrophilic fraction from the lipophilic fraction according to the method so that the ratio of egg yolk fat to egg yolk protein in the centrifuged egg yolk material is greater than 2.0:1; and (b) drying the resulting high fat to protein ratio egg yolk.

The invention also pertains to a process of preparing a high fat to protein ratio egg yolk which has a egg yolk fat to egg yolk protein ratio greater than 2.0:1, comprising recovering egg yolk from whole egg by substantially removing all of the incidental egg white in the whole egg so that the measured ratio of yolk fat to yolk protein in the egg white free yolk material is greater than 2.0:1. The incidental egg white can be separated from the egg yolk by washing or careful operation of a commercial egg breaking machine. The incidental egg white can be separated from the egg yolk by microfiltration.

The invention also pertains to a dried high fat to protein ratio egg yolk wherein the measured ratio of yolk fat to yolk protein is greater than 2.0:1.

According to the invention, the dried particulate foodstuff can comprise from about 1% to about 99% by weight of dried high fat to protein ratio egg yolk, the remainder being edible components.

The invention is also directed to a process for the manufacture of a foodstuff from foodstuff ingredients which comprises incorporating in the foodstuff ingredients about 1% to 99% by weight of a high fat to protein ratio egg yolk product wherein the measured ratio of yolk fat to yolk protein is greater than 2.0:1 and forming the foodstuff ingredients into a foodstuff.

The invention is also directed to a mayonnaise recipe having the following ingredients in the following proportions:

| INGREDIENT | UNIT AMOUNT (WT.) |
| --- | --- |
| Sugar | 1.4 |
| Salt | 1.7 |
| Garlic Powder | 0.1 |
| Onion Powder | 0.1 |
| Dried High Ratio Yolk prepared according to the process of claim 1 | 3.0 |
| City Water | 5.9 |
| Vinegar 5% | 8.0 |
| Lemon Juice | 1.5 |
| Dried Albumin | 0.3 |
| Canola Oil | 78.0 |
| | 100.00 |

The invention is also directed to a pancake recipe having the following ingredients in the following proportions:

| INGREDIENT | UNIT AMOUNT (WT.) |
| --- | --- |
| Wheat Flour | 54.2 |
| Corn Flour | 14.5 |
| Dried Milk Ingredients | 11.3 |
| Oil | 5.8 |
| Sugar | 5.8 |
| Dried High Ratio Yolk prepared according to the process of claim 1 | 4.6 |
| Double Acting Baking Powder | 3.8 |
| Salt | 1.0 |
| Lecithin | 0.5 |
| Water | 115 |

The high fat to protein ratio egg yolk concentrate can comprise mixing a high fat to protein ratio product prepared according to the invention with salt, sugar or other food grade electrolytes to produce a final product that can have a water activity of 0.85 or lower.

DETAILED DESCRIPTION OF THE INVENTION

A high fat to protein ratio egg yolk product having a fat to protein ratio greater than 2.0 to 1 is disclosed. The high fat to protein ratio egg yolk product was prepared according to the following method:

About 2000 kg of commercial egg yolk of greater than 45% solids was mixed one part of egg yolk to nine parts of cold, de-ionized (or RO filtered) water. The mixture was held in a settling tank at about 4° C. for 48 hours.

The lipidic fraction which settled to the bottom of the tank was removed by adding and mixing a saline solution calculated to amount to and add 0.125% of the total yolk fraction. This fraction was sampled and analyzed as shown below:

| HIGH RATIO YOLK PRODUCT | |
| --- | --- |
| Nutrients (per 100 g) | High Ratio Yolk |
| Protein - g | 10.26 |
| Moisture - g | 65.36 |
| Fat (total lipid) - g | 22.00 |
| Ash - g | 1.29 |
| Carbohydrate - g | 1.09 |
| Solids | 34.64% |
| Fat/Protein Ratio | 2.14 |

The resulting egg yolk product has a high fat to protein ratio of 2.14:1. This high fat to protein ratio egg yolk product can be used as a food product, or dried and mixed with other ingredients to make various food products such as bakery products, mayonnaise, and the like.

It is difficult to completely separate the liquid egg yolk from the liquid albumen. In a typical commercial operation where the yolk and albumen are ostensibly separated, some of the liquid albumen remains attached to the outer surface of the yolk sac. The "separated" or commercial liquid yolk is actually about 80 parts "pure yolk", and 20 parts liquid albumen, as shown below.

|  | FRACTION | |
| --- | --- | --- |
|  | Pure Liquid Yolk | Liquid Albumen |
| Solids | 0.518 | 0.115 |
| Liquid Egg 0.2415 | 31.5% | 68.5% |
| Commercial Liquid Yolk 0.4380 | 80.2% | 19.8% |

Liquid egg and liquid yolk of the above typical commercial fractions have the nutritional compositions shown below.

| COMMERCIAL LIQUID EGG PRODUCTS | | |
| --- | --- | --- |
| Nutrients (per 100 g) | Whole Eggs | Commercial Yolk |
| Protein - g | 11.95 | 15.5 |
| Moisture - g | 75.85 | 56.2 |
| Fat (Total Lipid) - g | 10.2 | 25.6 |
| Ash - g | 0.95 | 1.55 |
| Carbohydrate - g | 1.05 | 1.15 |
| Solids | 24.15% | 43.80% |
| Fat/Protein Ratio | 0.85 | 1.65 |

"Pure" liquid yolk and albumen have the nutritional compositions shown below.

| PURE LIQUID COMPONENTS (CALCULATED) | | |
| --- | --- | --- |
| Nutrients (per 100 g) | Pure Yolk | Pure Albumen |
| Fraction | 0.802 | 0.198 |
| Protein - g | 16.9 | 9.8 |
| Moisture - g | 48.2 | 88.55 |
| Fat (Total Lipid) - g | 31.9 | 0 |
| Ash - g | 1.78 | 0.6 |
| Carbohydrate - g | 1.17 | 1.05 |
| Solids | 51.80% | 11.45% |
| Fat/Protein Ratio | 1.89 |  |

As is apparent, the fat to protein ratio of commercial egg yolk is typically below 1.8:1; and even in "pure" egg yolk, the fat to protein ratio is less than 2.0:1.

EXAMPLES

Mayonnaise (Control)

A control mayonnaise style emulsion was prepared as follows:

| INGREDIENT | UNIT AMOUNT (WT.) |
| --- | --- |
| City Water | 0.9 |
| Canola Oil | 5.0 |
| Sugar | 1.4 |
| Salt | 1.7 |
| Garlic Powder | 0.1 |
| Onion Powder | 0.1 |
| Liquid Yolk | 5.0 |
| Liquid Albumin | 3.3 |
| Canola Oil | 36.5 |
| Vinegar 5% | 8.0 |
| Lemon Juice | 1.5 |
| Canola Oil | 36.5 |
|  | 100.00 |

The first eight ingredients were blended in a high-speed mixer to make a pre-emulsion. Canola oil was then added while maintaining constant shear to create an oil-water emulsion. Vinegar and lemon juice were then added with mixing. Finally, further canola oil was added with constant shear to produce a final emulsion. After two hours, the final emulsion was comparable to a typical commercial mayonnaise Mayonnaise Using High Ratio Egg Yolk The foregoing preparation was repeated as follows, replacing the liquid egg yolk with dried high ratio yolk according to the invention, dried albumin and water.

| INGREDIENT | UNIT AMOUNT (WT.) |
| --- | --- |
| Sugar | 1.4 |
| Salt | 1.7 |
| Garlic Powder | 0.1 |
| Onion Powder | 0.1 |
| Dried High Ratio Yolk | 3.0 |
| City Water | 5.9 |
| Vinegar 5% | 8.0 |
| Lemon Juice | 1.5 |
| Dried Albumin | 0.3 |
| Canola Oil | 78.0 |
|  | 100.00 |

All dry ingredients, including dried high ratio yolk, were pre-blended as a dry mix. The dry mix was then added to a mixture of water, lemon juice and vinegar and blended to provide an aqueous mix. It was noted that the dry mix dispersed rapidly and completely with minimal mixing. This behavior is not characteristic of commercial dried egg yolk, which is more difficult to disperse, and tends to form lumps which may be difficult to wet, even with vigorous mixing.

As was done in the control above, canola oil was then added with constant shear to create an oil-water emulsion. Alternatively, the water can be used initially, and then the vinegar and lemon juice can be added with mixing. Lastly, further canola oil was added with constant shear to produce the final emulsion, which after two hours, was found to be comparable in taste and behavior to the conventional mayonnaise.

Taste testing using a three-way taste preference method was conducted and no detectable difference in taste was noted between the control mayonnaise and the high ratio yolk mayonnaise according to the invention.

Pancake Mix (Control)

A control pancake mix was prepared as follows:

| INGREDIENT | UNIT AMOUNT (WT.) |
| --- | --- |
| Wheat Flour | 54.2 |
| Corn Flour | 14.5 |
| Dried Milk Ingredients | 10.0 |
| Oil | 5.8 |
| Sugar | 5.8 |
| Dried Whole Egg | 4.4 |
| Double Acting Baking Powder | 3.8 |
| Salt | 1.0 |
| Lecithin | 0.5 |
| Water | 115 |

All ingredients, except water, were pre-blended as a dry mix. The dry mix was then blended with the water as an aqueous mix, to produce a pancake batter. The batter was then used to make pancakes on a lightly greased electric griddle.

The pancakes were assessed for spread, rise, appearance and taste. A commercial pancake mix (Aunt Jemima™) using fresh shell eggs according to the recipe on the box was also mixed and cooked.

Although not identical, the control and Aunt Jemima pancakes were judged to be equally acceptable in overall performance.

Pancake Mix Using High Ratio Egg Yolk

The preparation recited above for the control pancake mix was repeated as follows, replacing the dried whole egg and the lecithin with dried high ratio yolk and a dried milk ingredient.

| INGREDIENT | UNIT AMOUNT (WT.) |
|---|---|
| Wheat Flour | 54.2 |
| Corn Flour | 14.5 |
| Dried Milk Ingredients | 11.3 |
| Oil | 5.8 |
| Sugar | 5.8 |
| Dried High Ratio Yolk | 4.6 |
| Double Acting Baking Powder | 3.8 |
| Salt | 1.0 |
| Lecithin | 0.5 |
| Water | 115 |

All ingredients, other than water, were pre-blended as a dry mix. The dry mix was then blended as an aqueous mix, to make a pancake batter. It was noted that the mix dispersed in the water more readily than the control, and the batter with less mixing was free of lumps. The batter was then used to make pancakes on a lightly greased electric griddle.

The pancakes were assessed for spread, rise, appearance and taste. The pancakes were judged to be easier to mix and prepare than either the control or the Aunt Jemima pancakes. The pancakes were judged to be superior in overall performance and taste to both the control pancakes and the Aunt Jemima pancakes.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A process for preparing a dried high egg yolk fat to protein ratio egg yolk which comprises:
   (a) separating an egg yolk from a whole egg;
   (b) concentrating the fat to protein ratio of the egg yolk so that the ratio is greater than 2.0:1 by immersing the egg yolk in an acceptable solvent which is selected from the group consisting of water, alcohol and other acceptable food grade solvent and permitting the egg yolk and the solvent to rest for at least 48 hours so that the egg yolk and the solvent separate into an upper hydrophilic fraction and a lower lipophilic fraction containing the high egg yolk fat to protein ratio egg yolk;
   (c) separating the lower lipophilic fraction from the upper hydrophilic fraction; and
   (d) drying the concentrated egg yolk in the lower fraction to produce the dried high egg yolk fat to protein ratio egg yolk.

2. A mayonnaise recipe having the following ingredients in the following proportions:

| Ingredient | Unit Amount (wt.) |
|---|---|
| Sugar | 1.4 |
| Salt | 1.7 |
| Garlic Powder | 0.1 |
| Onion Powder | 0.1 |
| Dried High Ratio Yolk prepared according to the process of claim 1 | 3.0 |
| City Water | 5.9 |
| Vinegar 5% | 8.0 |
| Lemon Juice | 1.5 |
| Dried Albumin | 0.3 |
| Canola Oil | 78.0 |
| | 100.00. |

3. A pancake recipe having the following ingredients in the following proportions:

| Ingredient | Unit Amount (Wt.) |
|---|---|
| Wheat Flour | 54.2 |
| Corn Flour | 14.5 |
| Dried Milk Ingredients | 11.3 |
| Oil | 5.8 |
| Sugar | 5.8 |
| Dried High Ratio Yolk prepared according to the process of claim 1 | 4.6 |
| Double Acting Baking Powder | 3.8 |
| Salt | 1.0 |
| Lecithin | 0.5 |
| Water | 115. |

4. A process for preparing a high fat to protein ratio egg yolk which comprises:
   (a) recovering an egg yolk from a whole egg;
   (b) immersing the egg yolk in food grade water at a ratio of 1 part egg yolk to at least 9 parts water;
   (c) permitting the egg yolk and the water to rest for at least 48 hours so that the egg yolk and water separate into an upper hydrophilic fraction and a lower lipophilic fraction containing the high fat to protein ratio egg yolk;
   (d) removing the lower lipophilic fraction from the upper hydrophilic fraction; and
   (e) drying the lower lipophilic fraction to produce the dried high fat to protein ratio egg yolk.

5. A process as claimed in claim 4 wherein the ratio of yolk fat to yolk protein in the dried lower fraction is greater than 2.0:1.

6. A process as claimed in claim 4 wherein the lower fraction is spray dried in a spray dryer having an air inlet temperature of from about 150° C. to 300° C. and an air outlet temperature of from about 75° C. to 175° C. so that the final moisture content of the dried lower fraction is less than about 10% by weight.

7. A process as claimed in claim 4 wherein the lower fraction is dried by freeze drying.

8. A process as claimed in claim 4 wherein the lower fraction is dried on a belt or in a drum dryer.

9. A process for preparing a high egg yolk fat to protein ratio egg yolk which comprises:
   (f) producing a high fat to protein ratio egg yolk product from egg yolk by following the method of claim 4 but including a combining agent in addition to the water so that the measured ratio of yolk fat to yolk protein in the recovered egg yolk is greater than 2.0:1, and;
   (g) drying the recovered egg yolk.

10. A process as claimed in claim 9 wherein the combining agent is ammonium sulphate, copper sulphate, dextrin or other suitable salt.

11. A process as claimed in claim 9 wherein the combining agent is selected from the group consisting of ammonium sulfate, copper sulfate, dextrin and another acceptable food grade salt, added to the water in step (b).

12. A process for preparing a high fat to protein ratio egg yolk as claimed in claim 4 which comprises:
   (f) using centrifugation when performing step (d) to accelerate the separation of the hydrophilic fraction from the lipophilic fraction so that the ratio of yolk fat to yolk protein in the centrifuged yolk material in the lipophilic fraction is greater than 2.0:1.

13. A dried high fat to protein ratio egg yolk produced by the process of claim 12 wherein the measured ratio of yolk fat to yolk protein is greater than 2.0:1, and the egg yolk product is mixed with salt, sugar or other food grade electrolytes to produce a final product that has a water activity of 0.85 or less.

14. A dried particulate foodstuff comprising from about 1% to about 99% by weight of dried high fat to protein ratio egg yolk as claimed in claim 13, the remainder being edible components.

15. A high fat to protein ratio egg yolk concentrate comprising mixing a high fat to protein ratio product prepared according to the method of claim 4 with salt, sugar or other food grade electrolytes to produce a final product that has a water activity of 0.85 or lower.

16. A process as claimed in claim 4 wherein the water is cold, de-ionized or RO filtered water.

17. A process of preparing a high fat to protein ratio egg yolk comprising
   (a) recovering egg yolk from whole egg by substantially removing all of the incidental egg white in the whole egg;
   (b) immersing the egg yolk in a compatible solvent selected from the group consisting of water, alcohol and another acceptable food grade solvent and a combining agent selected from the group consisting of ammonium sulphate, copper sulphate, dextrin and another acceptable food grade salt;
   (c) permitting the egg yolk and the solvent to rest for at least 48 hours so that the egg yolk and solvent separate into an upper hydrophilic fraction and a lower lipophilic fraction containing the high fat to protein ratio egg yolk;
   (d) removing the lower lipophilic fraction from the upper hydrophilic fraction; and
   (e) drying the lower lipophilic fraction to produce a dried high fat to protein egg yolk that has a ratio of yolk fat to yolk protein in the egg white free yolk material greater than 2.0:1.

18. A process as claimed in claim 1 wherein the incidental egg white is separated from the egg yolk by microfiltration.

19. A process for preparing a dried high egg yolk fat to protein ratio egg yolk which comprises:
   (a) separating an egg yolk from a whole egg;
   (b) concentrating the fat to protein ratio of the egg yolk so that the ratio is greater than 2.0:1 by immersing the egg yolk in cold, de-ionized or RO filtered water which is mixed with the egg yolk at a ratio of 1 part egg yolk to at least 9 parts water and permitting the egg yolk and the water to rest for at least 48 hours so that the egg yolk and the water separate into an upper hydrophilic fraction and a lower lipophilic fraction which contains the high egg yolk fat to protein ratio egg yolk;
   (c) separating the lower lipophilic fraction from the upper hydrophilic fraction by centrifugation; and
   (d) drying the concentrated egg yolk in the lower lipophilic fraction in a spray dryer to produce the dried high egg yolk fat to protein ratio egg yolk.

* * * * *